C. L. BOND.
ELECTRO AUTOMATIC NET WEIGHT MACHINE.
APPLICATION FILED SEPT. 30, 1907.

966,885.

Patented Aug. 9, 1910.
4 SHEETS—SHEET 4.

Witnesses:
H. N. Ashby.
J. Townsend.

Inventor:
Charles L. Bond.
by James R. Townsend
his Atty.

UNITED STATES PATENT OFFICE.

CHARLES L. BOND, OF LOS ANGELES, CALIFORNIA.

ELECTRO-AUTOMATIC NET-WEIGHT MACHINE.

966,885.

Specification of Letters Patent. Patented Aug. 9, 1910.

Application filed September 30, 1907. Serial No. 395,298.

*To all whom it may concern:*

Be it known that I, CHARLES L. BOND, a citizen of the United States, residing at Los Angeles, in the county of Los Angeles and State of California, have invented a new and useful Electro-Automatic Net-Weight Machine, of which the following is a specification.

It is of the objects of this invention to provide a superior weighing machine adapted to automatically weigh small packages of bulk material delivered continuously to a chute, and to weigh the material rapidly without any error arising from weight of the can or other receptacle in which the material is to be packed; also to provide for giving the attendant full control of the apparatus to open and close the chute independently of the automatic means and with minimum expenditure of time and labor.

In attaining the objects of this invention, means are provided for convenient application of manual power for operating the machine. Means are also provided for operating satisfactorily upon packages of greater or less depth; and means are provided for discharging the weighed material into the package, either automatically or manually, at the will of the attendant.

This machine is adapted for weighing roasted or unroasted berry coffee with great accuracy; provision being made for delivering to a weighing bucket an approximately uniform stream of the berry coffee. A difficulty which arises in automatically weighing berry coffee results from the shape of the berry, the same being approximately flat on one side and round on the other. By reason of this peculiarity of the coffee-berry, a stream of the same flowing through the chute is liable to be irregular in size, so that a variation will occur in the weight of the package. In this machine provision is made for avoiding this difficulty.

Other objects and advantages may appear from the subjoined detail description.

The accompanying drawings illustrate the invention:—

1 is a stationary chute; 2, a cut-off for said chute; 3, a scales of the even-balance type; 4, a weighing-bucket suspended therefrom below said chute 1 and provided with a trap-door-bottom 5.

6 is a fixed delivery-chute below the weighing-bucket 4; 7 is means in the form of a spring for closing the cut-off; 8 is means in the form of a latch for holding the cut-off spring inactive.

Electro-magnetic means are generally represented by electric-circuit 9, electro-magnet 10 in said circuit, armature 11, and circuit-breaker 12 and another circuit breaker 32 operable by scales 3 for releasing the cut-off-holding-means 8 to allow said cut-off to close. Manual means in the form of a handle 13 and rock-shaft 14, to which the cut-off 2 is fixed, are provided for independent manual operation of said cut-off.

Figures 1, 2, 9:
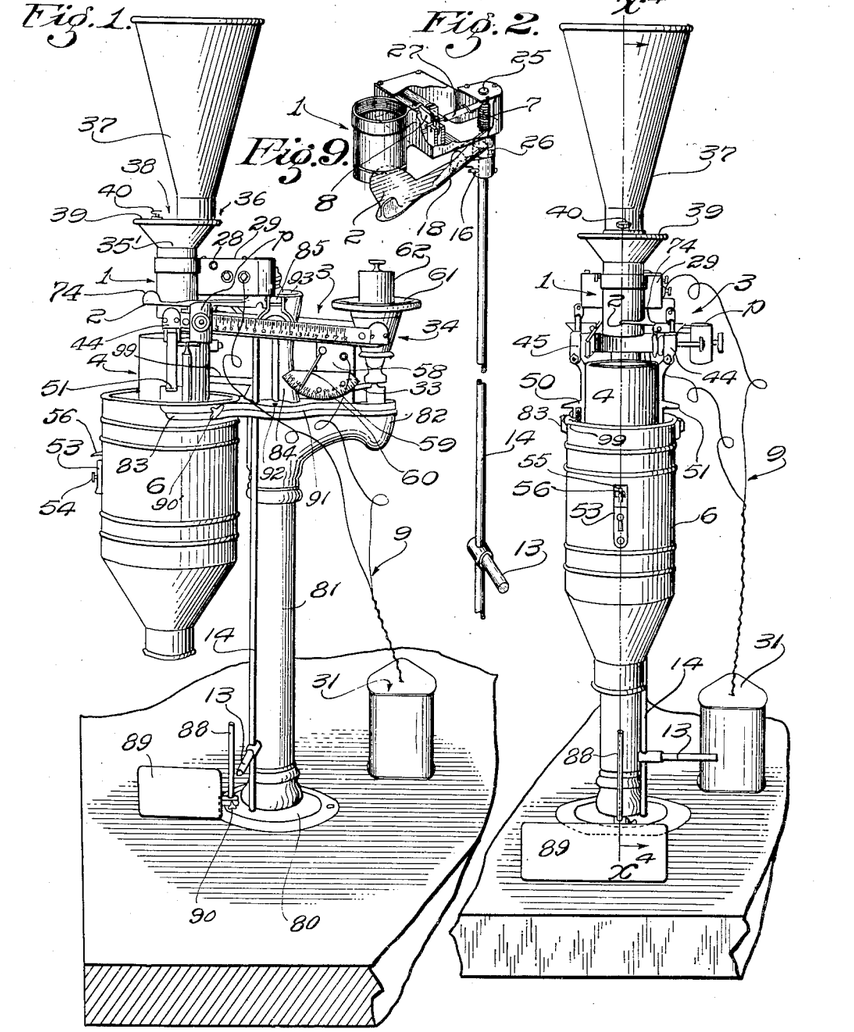
Figure 1 is a perspective view of a weighing machine embodying this invention, viewed from the side on which the graduations for balancing and adjusting the machine are visible. Said machine is shown mounted on a table at the left of which the operator will stand while conducting the operation of weighing.
Fig. 2 is a front elevation of the machine, the same being viewed from the left of Fig. 1, from the side on which the operator stands in the process of weighing.
Fig. 9, (Sheet 1), is a broken perspective view of the cut-off box together with operating-rod and handle, all shown detached from the rest of the machine. The parts are in position with the stationary chute open, and the automatic means for closing the cut-off, held by its keeper.
Figures 10, 11, 12, 13, 14, 15, 16, 17, 18:
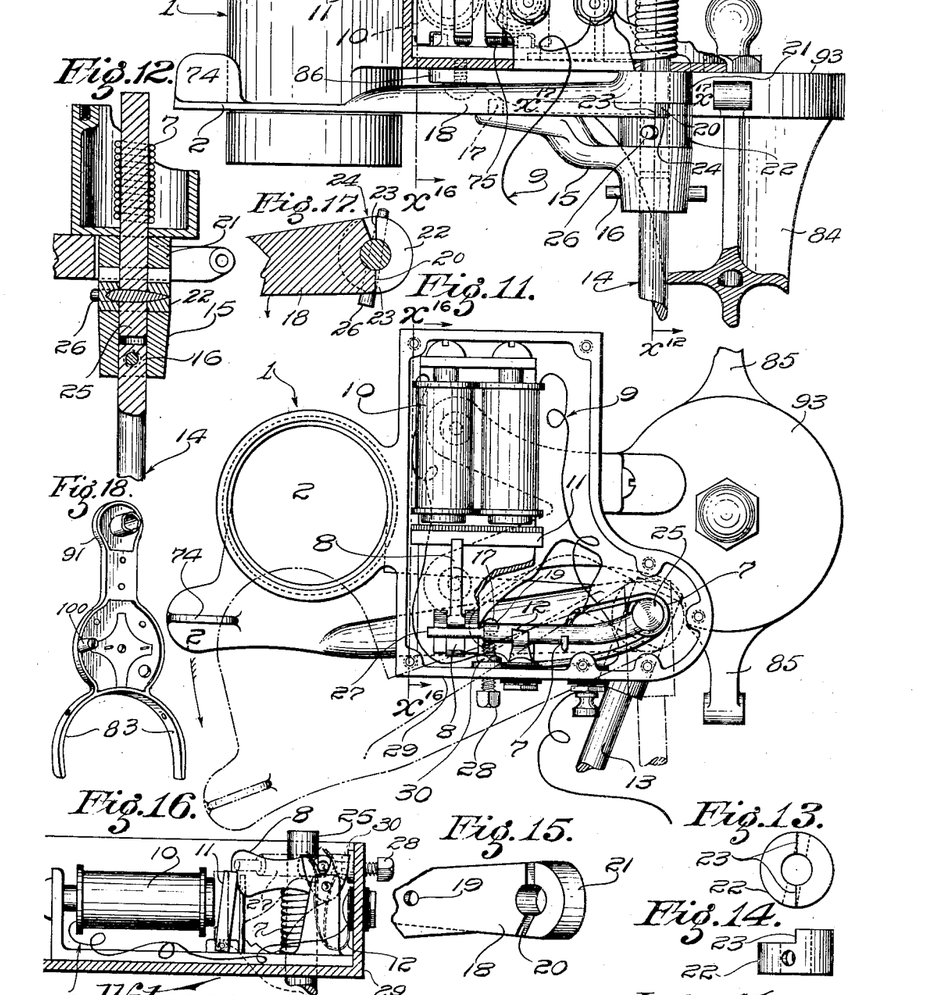
Fig. 10 is a fragmental elevation showing the cut-off-box together with support, said cut-off having been manually closed.
Fig. 11 is a fragmental plan of Fig. 10, the cut-off being shown manually closed by the handle on the operating-rod independently of the automatic cut-off mechanism which is shown in open position. Dotted lines show the open position of the cut-off.
Fig. 12 is a vertical section on line $x^{12}$, Fig. 10, looking in the direction of the arrows.
Fig. 13 is a plan of the clutch-collar.
Fig. 14 is an elevation of the same.
Fig. 15 is a fragmental view of the arm and hub of the cut-off.
Fig. 16 is a sectional elevation of the automatic mechanism from line $x^{16}$, Figs. 10 and 11.
Fig. 17 is a fragmental sectional detail to show the position of the clutch collar when the cut-off has been automatically closed. Line $x^{17}$ Fig. 10 indicates the sectional plane.
Fig. 18 is a view of the pillar cap detached.

The rock shaft 14 is rigidly connected with an arm 15 which is fastened to the end of the rock-shaft by a pin 16 and is provided with a lug 17 to engage the arm 18 by which the cut-off 2 is carried; said lug 17 being arranged to move the arm 18 and its cut-off 2 outward to open the passage through the stationary chute 1 upon the turning of the handle 13 and the rock-shaft 14 to the right in Fig. 1 and in the direction of the arrow leading from the end of the cut-off 2 in Fig. 11. The lug 17 may fit in a hole 19 in said arm 18, and said arm is provided with a shoulder 20 at its hub 21 to rest on a clutch-collar 22 which is provided with a like shoulder 23 to engage the shoulder 20.

The shoulders are formed in the arm 18 and clutch-collar 22 by cutting away a portion of the faces of these members; one shoulder, as the shoulder 23, occupying 180 degrees of the circle of the collar, and the shoulder 20 extending throughout something less than 180 degrees, thus to leave an open space 24, see Fig. 17, between the faces of the shoulders; said open space being of sufficient amplitude to allow the cut-off 2 to swing through a sufficient arc to open and close the passage through the stationary chute 1 without turning the clutch-collar 22, so long as said collar is retracted in the position shown in Fig. 10.

25 is a spring-actuated rock-shaft fastened by a pin 26 to the clutch-collar 22 and extending through and journaled in the hub 21 of the arm 18, and provided with an arm 27 to engage the latch 8 by which said arm may be held stationary. The spring 7 engages said arm to cause the rock-shaft 25 to rotate in a direction to close the cut-off 2 by reason of the engagement of the shoulder 23 with the shoulder 20.

By this construction the gate may be opened by turning the rock-shaft 14 by means of the handle 13. As the rock-shaft 14 is thus turned, the motion is communicated through the arm 15, the arm 18, hub 21, clutch-collar 22, and pin 26, to the rock-shaft 25 and its arm 27 to the latching position shown in Figs. 10 and 11. When the arm 27 is thus latched the rock-shaft 14 and the arm 18 are still free to be turned to close and open the stationary chute 1, thereby placing the machine entirely under the control of the operator, so that in case an accident should occur to the electrical appliances of the automatic devices no loss need occur as the attendant may immediately close the cut-off by means of the handle 13.

The latch 8 and the electro-magnetic means for operating the same are not claimed in this application, for the reason that the same have been patented to me.

28 is an adjustable stop in the form of a stud-screw screwed through a wall of the case 29 and fixed by means of a lock-nut 30. This stop intercepts the arm 27 and prevents it from moving too far. The latch 8 is held in latched position by an armature 11 adapted to be drawn out to latch-holding position by the energizing of the magnet 10 through the circuit 9 provided with battery 31 which may be in a case located at any suitable place.

The circuit is opened and closed through the medium of two circuit-breakers, one of which, viz.,—the circuit-breaker 12, is operated to close the circuit by the act of opening the cut-off 2, and is operated to open the circuit by the movement of the cut-off 2 in the act of closing. At the other circuit-breaker 32 the circuit is held open by the depression of a spring-operated bar 33 which is held down by the weighted end 34 of the scales so long as such weighted end of the scales is depressed. A spring 35 is provided to operate the bar 33 to close the circuit whenever the weighted arm 34 of the scales is withdrawn from said bar 33. When both the circuit-breakers 12 and 32 are closed, the current from the battery 31 energizes the magnet 10, thus withdrawing the armature 11 from the latch 8 and allowing the spring 7 to operate the arm 27, the rock-shaft 25, the clutch-collar 22, and thereby the arm 18 and the cut-off 2. At the same instant the circuit-breaker 12 is opened, thus avoiding waste of current.

Figures 3, 4:
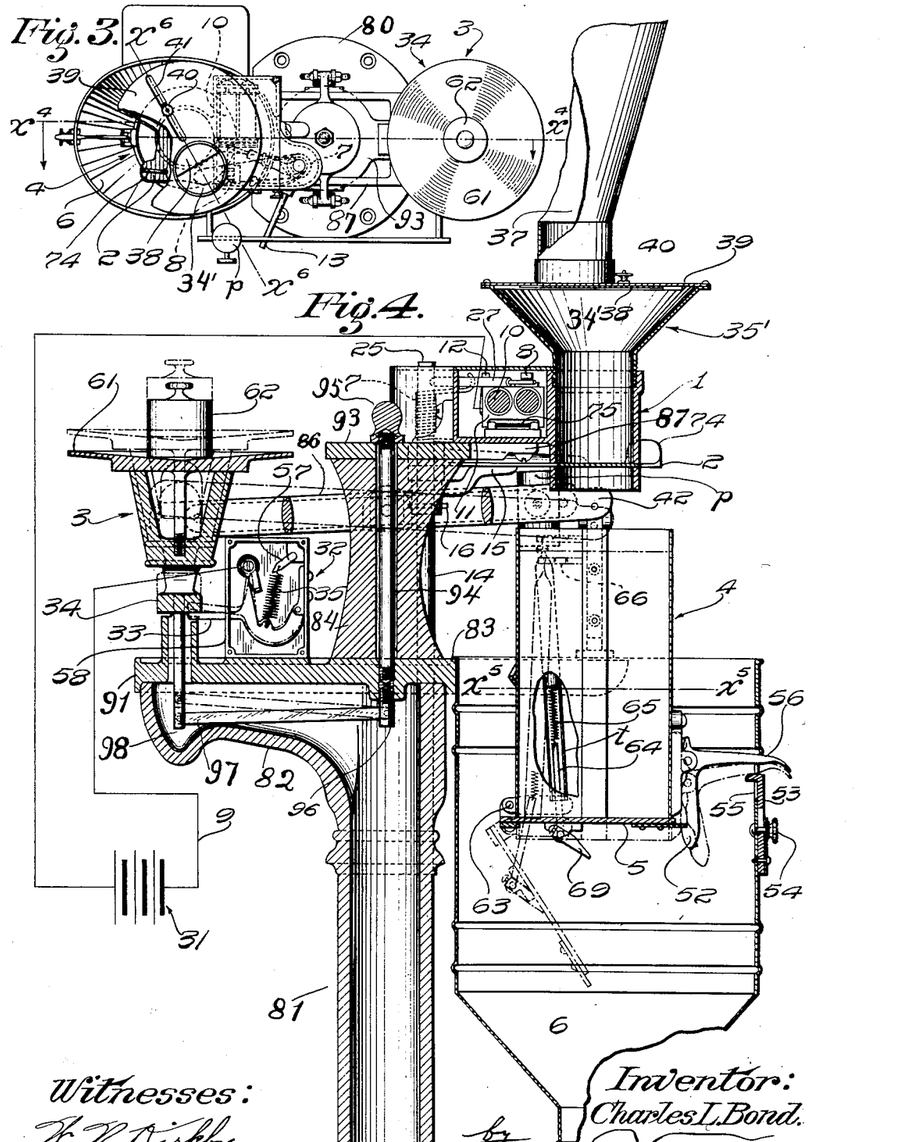
Fig. 3 is a broken plan of the machine omitting the chute.
Fig. 4 is an enlarged, fragmental, vertical section of the machine on line $x^4$, Figs. 2 and 3, looking in the direction of the arrows, from the side of the machine opposite that presented to view in Fig. 1.
Figures 5, 6, 7, 8:
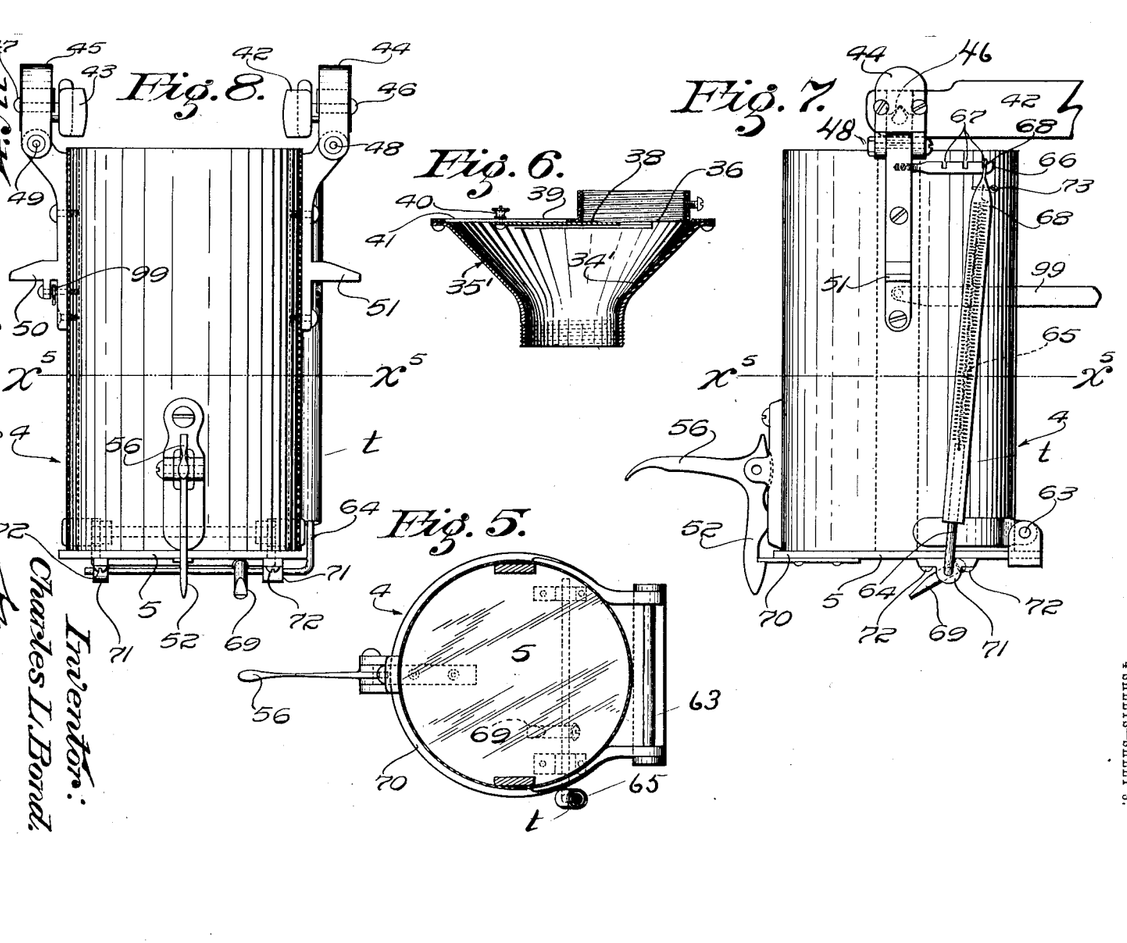
Fig. 5 is a plan section of the weighing bucket on line $x^5$, Figs. 4, 7 and 8.
Fig. 6 is a view of the feed-regulator detached, sectioned on line $x^6$, Fig. 3, illustrating the means for producing an even stream of berry-coffee.
Fig. 7 is a side elevation of the weighing bucket and a fragment of the scale-beam.
Fig. 8 is a front elevation of the weighing-bucket viewed from the left of Figs. 5 and 7. The front ends of the scale beam are shown.

For the purpose of accurately weighing coffee-berries, the means for delivering to the stationary chute 1 the material to be weighed, is made to include a coffee berry adjuster, spreader and condenser in the form of a face 34' of a funnel 35' which has at the top an opening 36 communicating with a funnel or chute 36 through which the coffee is fed to the opening 36. Said opening is regulable as to size by means of a gate 38 in the form of a slide in the top 39 of the funnel 35'; said slide being operable by thumb-screw 40 by which it may be set to any desired position and there secured, said screw traveling along a slot 41, and the slide being adjustable toward and from a vertical line drawn from the slanting face 34'. By reason of the construction shown, the coffee-berries falling through the opening 36, strike upon the slanting spreader 34' which is concave and downwardly-tapering, and tends to bring the coffee-berries into a stream of uniform diameter. The opening 36 is preferably circular, and a portion of the circle is cut off by the slide 38, the end of which is preferably straight so that the actual opening 36 when the slide is adjusted, is of semicircular shape, as seen in Fig. 3, and a semicircular stream is therefore delivered onto the semicircular, downwardly-tapering, contracting, slanting face 34′. By means of this arrangement I have been enabled to weigh coffee-berries with an accuracy which I have not been able to attain in any other way.

The weighing-bucket 4 is suspended from the front scale-beam ends 42, 43, by the hanger-loops 44, 45, and the pivots 46, 47, 48, 49, so as to hang vertically beneath the stationary chute 1 into which the funnel 35′ opens. The bucket is provided with two shoulders 50, 51, to rest on the top of the fixed delivery chute 6 to stop and support the bucket when the scales are overbalanced by the contents of the bucket in case said contents are retained by the trap-door-bottom 5 held by the latch 52. These shoulders 50 and 51 do not, in the ordinary operation of the machine, descend sufficiently to touch the top of the delivery chute 6, for the reason that means are provided for releasing the latch 52 in the ordinary operation of the machine before the shoulders 50 and 51 have engaged the top of the delivery-chute. The means provided for this purpose consist of a slide 53 adjustably fastened to the delivery-chute 6, by a set-screw 54 to close the lower end of a slot 55 in the wall of the chute 6, through which slot an arm 56 of the latch 52 extends.

It is necessary in order to accurately weigh coffee-berries, that the machine be adjusted for different grades of coffee; the better grades of coffee being heavier in proportion to the bulk than poorer grades. This adjustment is accomplished by means of the spring 35, (see Fig. 4), the tension of which is regulated by a lever 57 which is journaled in a box 58 and is adapted to be set and held by an arm 59 engaging in notches 60. Said arm 59 is a spring-arm tending to hold its end spring-pressed into said notches and thereby to retain the lever at the position into which the lever may be placed by the attendant in the operation of adjusting the machine.

When the machine is to be adjusted to weigh a particular grade of coffee, the slide 53 will be lowered sufficiently to allow the stops 50 and 51 to rest on the fixed delivery-chute 6 before the trigger 56 of the latch 52 can engage the slide. In adjusting the scale, the attendant first balances the empty scales with the bucket swinging free and without any weight on the scale-pan 61. This adjustment is made in the usual way of adjusting gravity scales, by means of a poise $p$. Then the weight 62 by which is to be weighed the coffee that is to fill the package, will be placed on the scale-beam. During all this operation the machine will have been set with the cut-off 2 shut so that no coffee can flow through into the bucket, and the bottom of the bucket will have been closed, as shown in Fig. 4, and held closed by the latch 52. The attendant will then open the cut-off 2, thus allowing the coffee to flow into the bucket.

When sufficient coffee has entered the bucket to overbalance the scales, the lever 33 will be released, and the spring 35 will cause the circuit-breaker to close the circuit, thus completing the circuit through the electro-magnet 10, whereupon the armature is attracted thereto and withdrawn from the latch, and the cut-off 2 is immediately closed by the operation of the spring 7. Now the operator will note whether or not the amount of coffee in the bucket is so great as to overbalance the weight 62. If the weight 62 is overbalanced, this indicates that the circuit has not been closed quite quick enough, and the attendant will thereupon move the pointer 59 to the right in Fig. 1, thus increasing the tension on the spring 15, shown in Fig. 4, and will thereupon make another test; and so on from test to test, moving the pointer in one or the other direction for successive tests until the amount of coffee delivered to the bucket is of exactly the required weight, whereupon, the machine is ready for practical automatic weighing.

The trap-door 5 of the bucket is hinged to the bucket by an offset hinge 63. Resilient means are provided for automatically closing the trap door bottom 5 of the bucket 4. For this purpose, 64 is a rod carried by a spring 65 which is supported by the bucket 4 through the medium of an arm 66, which is secured to said bucket and is provided with notches 67, so that a supporting loop 68 of the spring may be adjusted toward and from a vertical line drawn from the offset-hinge 63.

69 designates a finger at the lower end of the rod 64 arranged aslant downwardly and away from the offset-hinge 63 and toward the free end 70 of the trap door bottom of the bucket. The lower end of the rod 64 is bent and journaled in a bearing 71 fastened by rivets or screws 72 to the bucket bottom. The rod 64 is carried by a pendulous tube $t$ in which the spring 65 is fastened by a cotter pin 73.

When the bucket 4 is loaded and the latch 52 is withdrawn from the trap door bottom 5, the load on said bottom will cause the same to swing downward, thus extending the spring 65 and allowing the trap door bottom to fully withdraw and completely open the bottom of the bucket, so that an immediate discharge of the material therein can take place; but as the door swings downwardly, it engages the arm 69 and said arm tends to support the bucket at a point considerably farther from the hinge 63 than is the bearing 71. The consequence is that immediately the load or charge contained in the bucket is out of the way, the action of the spring 65 through the rod 64 and the finger 69 immediately throws the bucket bottom into latching position, where it is caught by the latch 52.

When the machine has been adjusted as hereinbefore detailed to weigh the amount to be deposited in the appropriate package to be filled, the attendant will adjust the slide 53 into position to intercept the trigger 56 at such a point as to release the trap door 5, immediately after the scales have turned sufficiently to release the circuit breaker 32 and allow the circuit to be closed thereby. In this way the contents of the bucket will be instantaneously dumped the instant the cut-off is closed; and when fully dumped the trap door instantaneously closes and the scale weight 62 has returned the bucket to position to receive another charge. Thereupon the attendant will operate the handle 13 to open the cut-off and allow another charge to flow into the bucket as before; from which time the operation just described will be repeated. The cut-off 2 is provided with a thumb-piece 74, by which the cut-off may be manipulated independently of the handle 13.

75 designates a light coil spring for the purpose of returning the armature 11 to latching position. Said spring is not of such strength as to prevent the instantaneous response of the armature to the action of the magnet when the same is energized, but is sufficient to return the armature to latching position immediately after the magnet is deënergized.

In order to adapt the weighing machine for ready installment and convenient and rapid use where packages of coffee or other commodity are to be weighed the same is constructed with a base 80 a pillar 81 mounted on said base, brackets 82, 83 oppositely disposed on said pillar, a standard 84 extending upward from said pillar, and brackets 85 mounted on said standard above the level of the pillar brackets 82, 83 to carry scale beam 86. The chute 1 is mounted on a bracket 87 of the standard and the cut off 2 and cut off box 29. The means for operating the cut off and the latch for holding the cut off open are also carried thereby. The circuit breaker 32 is mounted on the pillar bracket 82 and the fixed delivery chute 6 is fixed to the forward pillar bracket 83. An upright post 88 is fixed to the base 80 and carries an adjustable rest or shelf 89 adapted by means of a set screw 90 to be stationed at various heights below the mouth of the chute 6 to hold the carton, bag, can or other container to receive the coffee or other commodity that may be delivered thereto through the chute 6. The rock shaft 14 is journaled or stepped in the base 80 at the right side of the base, so that when the operator stands with the machine in front of him, he can place the containers for the packages on the shelf with his left hand while his right hand is free to set aside the filled package and to move the handle 13 to open the cut off 2.

By the construction and arrangement shown all the manual operations of handling and weighing the packages are brought into a narrow or limited space to facilitate and expedite the operation and to minimize the attention, labor and time required for weighing a determined number of packages.

For the purpose of ready manufacture and assembling, the bracket 83 is bifurcated and is provided with set screws 90' so that the chute 6 may be readily attached to and detached from the same for use or for storage and transportation as occasion may require; and the bracket 83 is formed as a bifurcated projection from a cap 91 stepped on and fastened by screws 92 to the pillar 81. The standard 84 is provided with a cap 93 from which the brackets 85 and 86 project. Said caps 91 and 93 and the standard 84 are secured together by a bolt 94 screwed into the pillar cap 91 and extending through the standard 84 and standard cap 93 which are fastened thereto by the cap nut 95. A stud 96 is screwed into the underside of the pillar cap 91 and the end hanger check rod 97 is pivoted thereto and to the end hanger rod 98. 99 is a check rod for pivotally connecting the bucket with a stationary part in the form of a slotted stud 100 projecting up from the pillar cap.

I term the downwardly tapering surface 34' in the conduit through which the coffee reaches the bucket a spreader for the reason that its effect is to spread the coffee berries into a stream in which said berries are evenly distributed so that one part of the stream acted on by the spreader will contain as many berries as any other part of such stream, of equal length. In consequence of this, the contents of the stream between the lower end of the surface 34' and the top of the body of coffee in the bucket at the time the scales start to move is uniform at all times with a given grade of coffee, and therefore by setting the starting spring 35 at a certain tension, the scales will be invariably started by said spring when a definite amount of coffee is between the cut off and the bucket. The cutoff instantly acts to prevent any addition to this amount and the scales are thus made to weigh invariably the same size package with invariable weight of coffee so long as the tension index 59 and the slide 38 remain unchanged. By moving the slide 38 toward and from the face 34' the size of the stream delivered to the cut off may be varied thus affording great nicety of adjustment.

In practical weighing the attendant will turn the lever 13 to the right to open the cut-off, and when the weighted scale moves up, the latch is released and the spring 7 turns the rod 14 and the handle 13 again to the left as it closes the cut-off. When another container has been put in position the handle 13 will again be turned to the right by the attendant and the work of weighing may thus proceed indefinitely.

The latch 56 may be operated manually at any time to release the trap door 5. As the trap door swings down the pendulous tube t swings toward the door hinge 63 until the finger 69 receives the door and the load is dumped. Then the tension of the spring quickly returns the door to the latch.

What I claim is:—

1. An automatic weighing machine comprising a stationary chute, a cut-off for said chute, a scales, a weighing bucket suspended therefrom below said chute and provided with a trap door bottom, a fixed delivery chute below the weighing bucket, means for closing the cut-off, means for holding the cut-off open, means operable by the scales for releasing the cut-off holding means, manual means for opening the cut-off, means for holding the trap door closed comprising a latch and a handle projecting from the latch through a slot in the fixed delivery-chute, and means for releasing the trap door comprising an adjustable stop in the slot.

2. An automatic weighing machine comprising a stationary chute, a cut-off for said chute, a scales, a weighing bucket suspended therefrom below said chute and provided with a trap door bottom, a fixed delivery chute below the weighing bucket, means for closing the cut-off, means for holding the cut-off open, means operable by the scales for releasing the cut-off holding means, manual means for opening the cut-off, means for holding the trap-door closed comprising a latch and a handle projecting from the latch through a slot in the fixed delivery-chute, means for releasing the trap-door, comprising an adjustable stop in the slot, and means for automatically operating the trap-door releasing means.

3. An automatic weighing machine comprising a stationary chute, a cut-off for said chute, a scales, a weighing bucket suspended therefrom below said chute and provided with a trap door bottom, a fixed delivery chute below the weighing bucket, means for closing the cut-off, means for holding the cut-off open, means operable by the scales for releasing the cut-off holding means, manual means for opening the cut-off, means for holding the trap-door closed comprising a latch with a handle extending through a slot in the fixed delivery-chute, means for releasing the trap-door, consisting of the movement of the bucket under the load, and adjustable means for automatically operating the trap-door releasing means comprising an adjustable stop in the slot.

4. In an automatic weighing machine, a scales, a weighing bucket carried by the scales, a hopper having an inclined wall and discharging into the weighing bucket, a chute leading to the hopper, and a gate adjustably mounted on top of the hopper and moving to and from one side of the hopper to regulate the flow from the chute and to direct the flow against the inclined wall of the hopper.

5. In an automatic weighing machine, a scales, a weighing bucket carried by the scales, a circular hopper discharging into the weighing bucket, a chute discharging against one side of the hopper, and adjustable means for regulating the flow from the chute to the hopper.

6. In an automatic weighing machine, a scales, a weighing bucket carried by the scales, a funnel-shaped chute discharging into the bucket, a conduit discharging against one side of the funnel-shaped chute, said conduit being smaller than the upper end of the funnel, and means for adjustably regulating the flow from the conduit to the funnel.

7. In an automatic weigher, a scales, a weighing-bucket carried by the scales and provided with a trap-door bottom, a delivery chute inclosing the lower portion of the weighing-bucket and provided with a vertical slot, a latch for holding the trap-door closed and having a handle extending through the vertical slot, a stop in the vertical slot to operate the handle and release the latch as the bucket descends under the load, and a spring for closing the trap-door after the load has passed.

8. An automatic weighing machine comprising a scales, a weighing bucket carried by said scales and provided with a trap-door bottom, a delivery chute inclosing the lower portion of said weighing bucket and provided with a vertical slot, a latch for the trap-door of said bucket, the same being provided with a handle extending through said slot in said chute, and an adjustable stop operable in said slot to intercept said handle to trip the latch.

9. In an automatic weighing machine, a scale, a weighing-bucket connected to the scale and adapted to move downwardly when the scale is overbalanced, a trap-door bottom hinged to the bucket, a swinging resilient support for the trap-door connected to the bucket and journaled to the trap-door at a point in front of the hinge, and a finger extending forwardly from the resilient support to engage the door when the door falls, said resilient means and finger serving to allow the door to swing downwardly under the load and serving to return the door to its closed position when the load has passed.

10. In an automatic weigher, a scales, a weighing-bucket attached to the scales, a chute discharging into the bucket, a cut-off for the chute, a delivery-chute below the bucket, a package-support below the delivery-chute, a rock-shaft for operating the cut-off, and a handle upon the rock-shaft near the package-support.

11. In an automatic weighing machine, a scales, a weighing bucket connected to the scales, a funnel mounted vertically and discharging into the bucket, a conduit mounted vertically and discharging into one side of the funnel, and an adjustable gate covering the other side of the funnel to direct the product against the inclined wall of the funnel so as to produce an even stream.

12. In an automatic weighing machine, a scales, a weighing-bucket carried by the scales, a trap-door-bottom hinged to the bucket, a latch and handle for holding the trap-door bottom closed, a funnel discharging into the weighing-bucket, a conduit discharging into the funnel, the stream from the conduit being directed against one side of the funnel, a cut-off below the funnel, means for operating the cut-off by the weight of the load in the weighing bucket, a delivery-chute below and around the weighing-bucket and having a slot through which the latch-handle extends, and an adjustable stop in the slot for regulating the opening of the trap-door-bottom.

13. A weighing machine comprising a scales, a weighing bucket carried thereby, a conduit in line with said bucket, a cut-off in said conduit, means for actuating said cut-off, a feed regulator carried by said conduit provided with an orifice and a spreader below the orifice, a hopper in line with said orifice, and means for regulating the size of said orifice.

14. A weighing machine comprising a scale, a weighing bucket carried thereby, a delivery conduit in line with said bucket, a cut-off in said conduit, automatic means for operating said cut-off, said means being controllable by the movement of the scale-beam, and manual means for opening and closing said cut-off without disturbing the automatic means for actuating the same.

15. An automatic weighing bucket provided with a trap door bottom having an offset hinge, a spring, a rod carried by the spring and journaled to the bucket bottom and provided with a finger extended downwardly away from the offset hinge and toward the free end of said bottom to be engaged by and to return said bottom when the same is open.

16. An automatic weighing bucket provided with a trap door bottom having an offset hinge, a spring, means to adjust the upper end of the spring toward and from a vertical line drawn from said hinge, a rod carried by the spring and journaled to the bucket bottom and provided with a finger extended downwardly away from the offset hinge and toward the free end of said bottom to be engaged by and to return said bottom when the same is opened.

17. A bucket provided with a hinged bottom, a spring, means to support the upper end of the spring, and means connected with the spring to support the bucket bottom by engagement at different distances from the hinge, the engagement for support being further removed from the hinge when the bottom is open than when it is closed.

18. The combination with a hinged trap door of a swinging resilient support therefor, the same being adapted to engage the trap door at a greater distance from the hinge when the door is open than when it is closed.

19. The combination with a bucket, of a pendulous tube connected therewith, a spring in said tube, a rod in the tube connected with the spring, a trap door bottom hinged to the bucket, said rod being journaled to said bottom and provided with a finger to engage the bottom between the journal and the free edge of the bottom.

20. An automatic weighing machine comprising a support consisting of a base and a pillar mounted on said base, brackets oppositely disposed on said pillar, a standard extending upward from said pillar, brackets mounted on said standard, a scale-beam carried by said brackets of said standard and extending above the level of the brackets of the pillar, a chute mounted on a bracket of the standard, a cut-off for said chute carried by the last-named bracket, means carried by said bracket for operating said cut-off, a latch for holding said cut-off open, electromagnetic means for releasing said latch, an electric circuit, a circuit breaker for said circuit mounted on one of the pillar brackets and adapted to be operated to close the circuit when the scale-beam on that side rises, and a weighing bucket connected with the scale-beam on the opposite side of said pillar beneath said chute.

21. An automatic weighing machine comprising a support consisting of a base and a pillar mounted on said base, brackets oppositely disposed on said pillar, a standard extending upward from said pillar, brackets mounted on said standard, a scale-beam carried by said brackets and extending above the brackets of the pillar, a chute mounted on a bracket of the standard, a cut-off for said chute carried by the last-named bracket, means carried by said bracket for operating said cut-off, a latch for holding said cut-off open, electro-magnetic means for releasing said latch, an electric circuit, a circuit-breaker for said circuit mounted on one of the pillar brackets and adapted to be operated to close the circuit when the scale-beam on that side rises, a weighing bucket connected with the scale-beam on the opposite side of said pillar beneath said chute, a delivery chute fastened to the pillar on the side opposite the circuit-breaker and provided with a slot, a trap-door bottom for the bucket, and a latch for said trap-door provided with a handle extending through said slot.

22. An automatic weighing machine comprising a base, a pillar, a package support near the base, a scales, a weighing bucket carried thereby, a chute above the weighing bucket, a cut-off for said chute, means for closing the cut-off, a latch to hold said means in open position, electro-magnetic means operable by the scales for releasing said latch, a vertical rock shaft to return the cut off to open position, a handle on said rock shaft near said base, and automatic means for opening the bucket to dump the contents thereof when the bucket descends, and automatic means for closing the bucket when the contents have been discharged.

23. In a weighing machine, a fixed delivery chute provided with a slot, a weighing bucket in the chute, provided with a trap door hinged to one side of the bucket, a latch for said trap door, projecting through said slot, a slide adjustably mounted on the chute in the path of the latch, and means to return the trap door to closed position.

24. In a weighing machine, a cut-off provided with an arm, a rock shaft on which said arm is journaled, means for automatically rotating said rock shaft, a latch for said means, a manually rotatable rock shaft, an arm fixed to the latter rock shaft and connected with the cut-off arm, a collar fixed to the first named rock shaft and operable by rotation of the other rock shaft and adapted to allow a limited rotation of one rock shaft independently of the other for the purpose of opening and closing the cut off independently of the automatic means when the same are latched.

25. In a weighing machine, two coaxial rock shafts, automatic means to rotate one of said shafts, a latch for said automatic means, manual means to rotate the other shaft, a cut-off, means connecting the manually operable rock shaft with the cut-off, and means forming a connection between the two rock shafts constructed with a limited play whereby each may be rotated by the other and the cut-off may be manually opened and closed while the automatic means are latched.

In testimony whereof, I have hereunto set my hand at Los Angeles California this 23d day of September 1907.

CHARLES L. BOND.

In presence of—
  JAMES R. TOWNSEND,
  JULIA TOWNSEND.